United States Patent
Swiniarski et al.

(10) Patent No.: US 11,091,112 B2
(45) Date of Patent: Aug. 17, 2021

(54) VEHICLE AIRBAG ASSEMBLY AND ASSOCIATED METHOD OF FORMING

(71) Applicant: Ford Global Technologies, LLC, Dearborn, MI (US)

(72) Inventors: Michal Jan Swiniarski, Brentwood (GB); Timothy Scott, Benfleet (GB)

(73) Assignee: FORD GLOBAL TECHNOLOGIES, LLD, Dearborn, MI (US)

( * ) Notice: Subject to any disclaimer, the term of this patent is extended or adjusted under 35 U.S.C. 154(b) by 70 days.

(21) Appl. No.: 16/773,127

(22) Filed: Jan. 27, 2020

(65) Prior Publication Data
US 2020/0238940 A1      Jul. 30, 2020

(30) Foreign Application Priority Data
Jan. 28, 2019   (GB) ..................................... 1901152

(51) Int. Cl.
| B60R 21/2165 | (2011.01) |
| B60R 21/205  | (2011.01) |
| B60R 21/215  | (2011.01) |
| B60R 21/217  | (2011.01) |

(52) U.S. Cl.
CPC ........ *B60R 21/2165* (2013.01); *B60R 21/205* (2013.01); *B60R 21/2171* (2013.01); *B60R 2021/21506* (2013.01)

(58) Field of Classification Search
None
See application file for complete search history.

(56) References Cited

U.S. PATENT DOCUMENTS

| 5,046,758 A | 9/1991 | Rafferty et al. | |
| 6,523,854 B1 * | 2/2003 | Muller | B60R 21/2155 280/728.3 |
| 6,817,627 B2 * | 11/2004 | Galmiche | B60R 21/205 280/730.1 |
| 6,929,281 B2 * | 8/2005 | Loeper | B60R 21/2155 280/728.3 |

(Continued)

FOREIGN PATENT DOCUMENTS

JP       2007118895 A       5/2007

OTHER PUBLICATIONS

GB Combined Search and Examination Report dated Jul. 30, 2019 re Appl. No. GB1901152.7.

*Primary Examiner* — Faye M Fleming
(74) *Attorney, Agent, or Firm* — Frank A. MacKenzie; Bejin Bieneman PLC

(57) ABSTRACT

A vehicle airbag assembly includes a vehicle trim panel including at least one door having an outer surface facing a vehicle cabin and an inner surface facing an airbag prior to deployment, In a pre-deployed state the door extends across an opening and is movably coupled to a rim to open upon deployment of the airbag to permit passage of the airbag through the opening. At least one edge of the door has a tear seam that couples the door to the vehicle trim panel. A bridging member is adjacent the inner surface of the door. The bridging member is configured to contact the inner surface at a location away from the rim and support the door in the pre-deployed state. The bridging member extends at least partially across the opening and is movable upon deployment of the airbag such that the airbag is permitted to pass through the opening.

16 Claims, 12 Drawing Sheets

(56) References Cited

U.S. PATENT DOCUMENTS

| | | | | |
|---|---|---|---|---|
| 8,783,711 B2* | 7/2014 | Webber | ............... | B60R 21/2155 |
| | | | | 280/728.3 |
| 2003/0205890 A1* | 11/2003 | Davis, Jr. | .............. | B60R 21/205 |
| | | | | 280/732 |

* cited by examiner

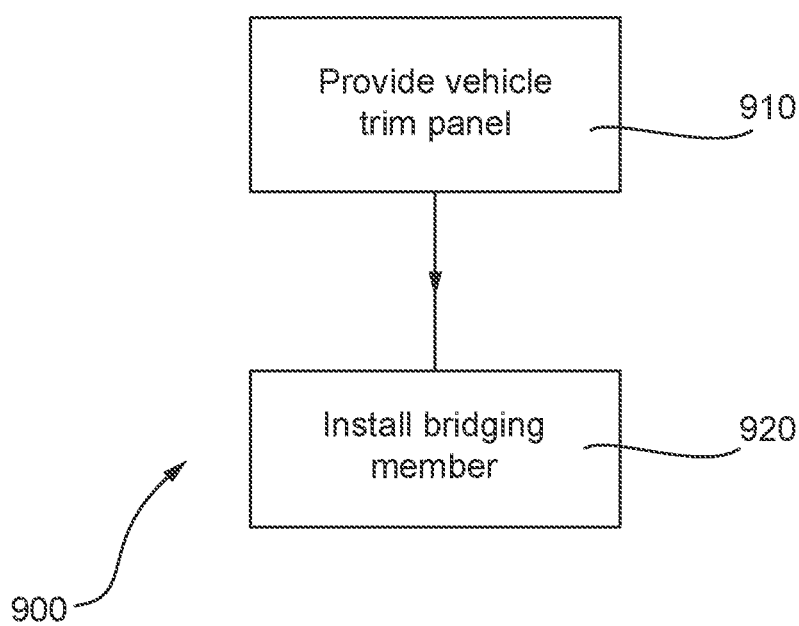

VEHICLE AIRBAG ASSEMBLY AND ASSOCIATED METHOD OF FORMING

CROSS-REFERENCE TO RELATED APPLICATION

This patent application claims priority to United Kingdom Application No. GB 1901152.7 filed on Jan. 28, 2019, which is hereby incorporated by reference in its entirety.

FIELD OF THE DISCLOSURE

This disclosure relates to a vehicle airbag assembly and method, and in particular, but not exclusively, relates to a piece of airbag trim that is configured to resist deflection from within the passenger compartment of the vehicle.

INTRODUCTION

A modern vehicle, such as a car or a truck, is typically fitted with one or more airbags. For example, a vehicle may be fitted with a first airbag that deploys from a steering wheel of the vehicle and a second airbag that deploys from a trim panel of the vehicle, such as a dashboard trim panel.

In many cases, a trim panel is used to conceal the airbag behind the trim panel, e.g., within a body portion of the vehicle. In order for the airbag to deploy from behind the trim panel, the trim panel may be provided with a frangible portion that is configured to break or tear open upon the application of a force provided by the airbag as it rapidly inflates and expands from its position behind the trim.

On the one hand, the trim panel must be weak enough to break open to effect the deployment of an airbag, and on the other hand, the trim panel must be sturdy enough to not break as a result of routine use. The present disclosure provides a solution, for example for commercial vehicles, in which trim panels should be extremely durable in order to cope with the tough working requirements of the vehicle.

SUMMARY OF THE DISCLOSURE

According to an aspect of the present disclosure there is provided a vehicle airbag assembly including:

a vehicle trim panel including at least one door having an outer surface configured to face a vehicle cabin and an inner surface configured to face an airbag prior to deployment, wherein in a pre-deployed state the door extends across an opening, and wherein the door is movably coupled to a rim of the vehicle trim panel such that the door is configured to open upon deployment of the airbag to permit passage of the airbag through the opening, at least one edge of the door having a tear seam that couples the door to a corresponding edge of the vehicle trim panel and breaks upon deployment of the airbag; and a bridging member provided adjacent to the inner surface of the door, the bridging member configured to contact the inner surface at a location away from the rim and support the door in the pre-deployed state, wherein the bridging member extends at least partially across the opening and is movable upon deployment of the airbag such that the airbag is permitted to pass through the opening.

The door outer surface may be contiguous with an outer surface of the rim. A pair of doors may be provided and the doors together may be contiguous with the outer surface of the rim. The door outer surface may be continuous with the rim outer surface.

The trim panel may include a tear-open airbag deployment region formed from a plurality of sections, e.g., doors, which cooperate to cover the airbag in an installed configuration, the sections being joined by a tear seam. The panel may be formed such that the sections and tear seam are unitary in structure, i.e. formed from a single piece of material. The tear-open airbag deployment region may be formed from two sections. Each of the sections may cover approximately half of the tear-open airbag deployment region.

The vehicle airbag assembly may further include a side wall. The bridging member may be coupled to the side wall.

The bridging member may include at least one rib at an end thereof. The side wall includes at least one corresponding rib. The bridging member rib and side wall rib may cooperate so as to provide a snap fit for the bridging member.

The side wall may include a slot configured to receive an end of the bridging member.

One of the side wall and bridging member may include a groove configured to receive a cooperating part on the other of the side wall and bridging member. The groove and cooperating part may cooperate to couple the bridging member to the side wall. The groove and cooperating part may be T-shaped, e.g., such that an abutment surface on the cooperating part may abut a shoulder of the groove.

The bridging member may be rotatably coupled to the side wall. Additionally or alternatively, the bridging member may be rotatably coupled to the door.

The vehicle trim panel may further include a perimeter wall extending from an inner surface of the vehicle trim panel and substantially surrounding the opening. The perimeter wall may be configured to receive an airbag canister in which the airbag may be provided. The airbag canister may cooperate with engaging portions on the perimeter wall to hold the canister in place. The perimeter wall may form the side wall to which the bridging member may be coupled.

The vehicle airbag assembly may further include an airbag canister in which the airbag is provided. The airbag canister may include a housing wall and the housing wall may form the side wall to which the bridging member is coupled.

The door may be elongate and may extend in a longitudinal direction. The tear seam may include an elongate channel formed in the airbag-facing inner surface of the vehicle trim panel. The bridging member may extend across a width of the opening. For example, the bridging member may span the width of the opening. Alternatively, the bridging member may extend across a portion of the width of the opening.

The vehicle airbag assembly may include a pair of bridging members. For example, bridging members may extend from opposite sides of the opening and together may extend across at least a portion of the width of the opening. The pair of bridging members may be provided at the same lengthwise location.

The vehicle airbag assembly may include a plurality of bridging members. The bridging members may be spaced apart in a lengthwise direction of the opening.

The bridging member may include a frangible portion that may break upon deployment of the airbag. The bridging member (or portions thereof) may move out of the way of a deploying airbag once the frangible portion has broken.

The bridging member may include at least one arch or portions thereof. The arch may provide rigidity in compression, e.g., when a force is applied on the trim panel outer surface. By contrast, the arch may readily collapse when a force is applied by a deploying airbag. The arch may overarch from one side of the opening to the other, e.g., with a convex side of the arch facing the inner surface of the door. The arch may rise from edges of the opening towards a point of contact with the inner surface of the door.

The arch may have an apex that extends from one side of the opening to the other. A plurality of such arches may be provided alongside one another so as to form a corrugated bridging member.

The bridging member may include a beam that extends from one side of the opening to the other.

The bridging member may include at least one strut that supports the inner surface of the door.

The bridging member may include a cantilever with a free end that supports the inner surface of the door.

The bridging member may include a rigid portion and a flexible portion. The rigid portion may contact the inner surface of the door. The rigid portion may be suspended from the flexible portion so as to restrict movement of the rigid portion away from the inner surface. The flexible portion and rigid portion may be coupled to the trim panel at points spaced apart from one another. The flexible portion may transmit a tensile force and the flexible portion may not transmit a compressive force. The flexible portion may flex and the rigid portion may be free to move when the airbag is deployed. By contrast, the flexible portion may support the rigid portion when the trim panel is depressed.

The bridging member may be formed integral to the vehicle trim panel, e.g., in a moulding process.

The bridging member may be pre-stressed such that the bridging member may be biased towards the inner surface of the door.

A vehicle may include the above-mentioned vehicle airbag assembly.

According to another aspect of the present disclosure there is provided a method of forming a vehicle airbag assembly, the method including:

providing a vehicle trim panel including at least one door having an outer surface configured to face a vehicle cabin and an inner surface configured to face an airbag prior to deployment, wherein in a pre-deployed state the door extends across an opening, and wherein the door is movably coupled to a rim of the vehicle trim panel such that the door is configured to open upon deployment of the airbag to permit passage of the airbag through the opening, at least one edge of the door having a tear seam that couples the door to a corresponding edge of the vehicle trim panel and breaks upon deployment of the airbag; and deploying, e.g., installing, a bridging member so as to be adjacent to the inner surface of the door, the bridging member configured to contact the inner surface at a location away from the rim and support the door in its pre-deployed state, wherein the bridging member extends at least partially across the opening and is movable upon deployment of the airbag such that the airbag is permitted to pass through the opening.

For example, the bridging member may be retro-fitted to an existing vehicle trim panel.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

BRIEF DESCRIPTION OF THE DRAWINGS

For a better understanding of the present disclosure, and to show more clearly how it may be carried into effect, reference will now be made, by way of example, to the accompanying drawings, in which:

FIG. 14 is a flowchart depicting a method according to the present disclosure.

DETAILED DESCRIPTION

The present disclosure relates to a vehicle airbag assembly for a vehicle, such as a motor vehicle (e.g., car, van, truck, motorcycle etc.), marine vessel, aircraft or any other type of vehicle. In particular, the vehicle airbag assembly includes a trim panel configured to conceal an airbag within a portion of the vehicle, such as within a dashboard of the vehicle.

Figure 1:
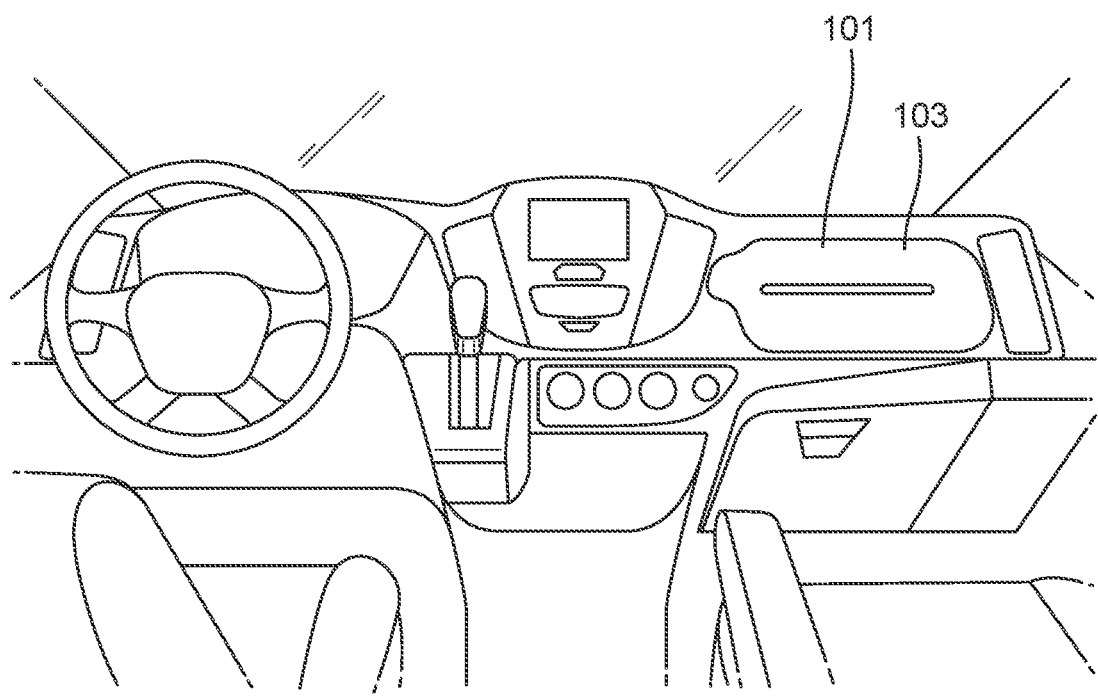
FIG. 1 shows a dashboard of a vehicle.

FIG. 1 shows a dashboard of a vehicle, the dashboard having a trim panel 101 configured to cover a front passenger-side airbag. However, the trim panel 101 may be any appropriate type of trim panel. For example, the trim panel 101 may be configured to cover, e.g., conceal, any type of airbag of the vehicle, such as a side curtain airbag, side door airbag, knee airbag, front driver-side airbag or any other type of airbag.

In order to allow the airbag to deploy from behind the trim panel 101, the trim panel 101 includes a tear-open airbag deployment region 103 that is configured to break and open in an outward manner, i.e. into the passenger compartment of the vehicle, as a result of the rapid inflation and expansion of the airbag. Typically, in previously-proposed arrangements, the tear-open airbag deployment region 103 (hereinafter referred to as the region 103) includes a single section, e.g., a door, configured to cover the airbag in an installed configuration. In a first operative state, e.g., where the airbag has not been deployed, the door is connected to the trim panel 101 along one edge of the door by virtue of a hinge, and is connected to the trim panel 101 on the remainder of its edges by a tear seam, which is usually provided on the airbag-facing side of the trim panel 101.

In a second operative state, where the airbag has been deployed, the door remains connected to the trim panel 101 by virtue of the hinge, but becomes broken away from the remainder of the trim panel 101 at the weakened region provided by the tear seam, as a result of the force applied to the airbag-facing side of the trim panel 101 upon the rapid inflation and expansion of the airbag. In many instances the hinge is formed integral to the trim panel 101, e.g., by providing a line of weakness in the trim panel 101 about which the door can pivot, but not break away from under the force of the expanding airbag.

One way in which the deployment time of an airbag can be reduced, is to provide a plurality of smaller sections, e.g., smaller doors that cooperate to cover the airbag in an installed configuration. For example, the region 103 may include a plurality of sections joined by a tear seam. However, in contrast to a trim panel that has a single tear-open section, the tear seam of a trim panel having multiple tear-open sections is located away from the periphery of the region 103. As a result of the position of the tear seam, it is unable to be supported by another component, such as the instrument panel. As such, the tear seam is at risk of being broken by the application of a force to the trim panel 101 from the passenger-facing side of the trim panel 101. Such a problem may be of particular concern for larger trim panels, e.g., a trim panel for a dashboard of a commercial vehicle, since such trim panels may be regularly exposed to loading, e.g., as a result of an occupant of the vehicle leaning on the dashboard.

On the one hand, the trim panel must be weak enough to break open to effect the deployment of an airbag, and on the other hand, the trim panel must be sturdy enough to not break as a result of routine use. The present disclosure provides a solution.

Figure 2:
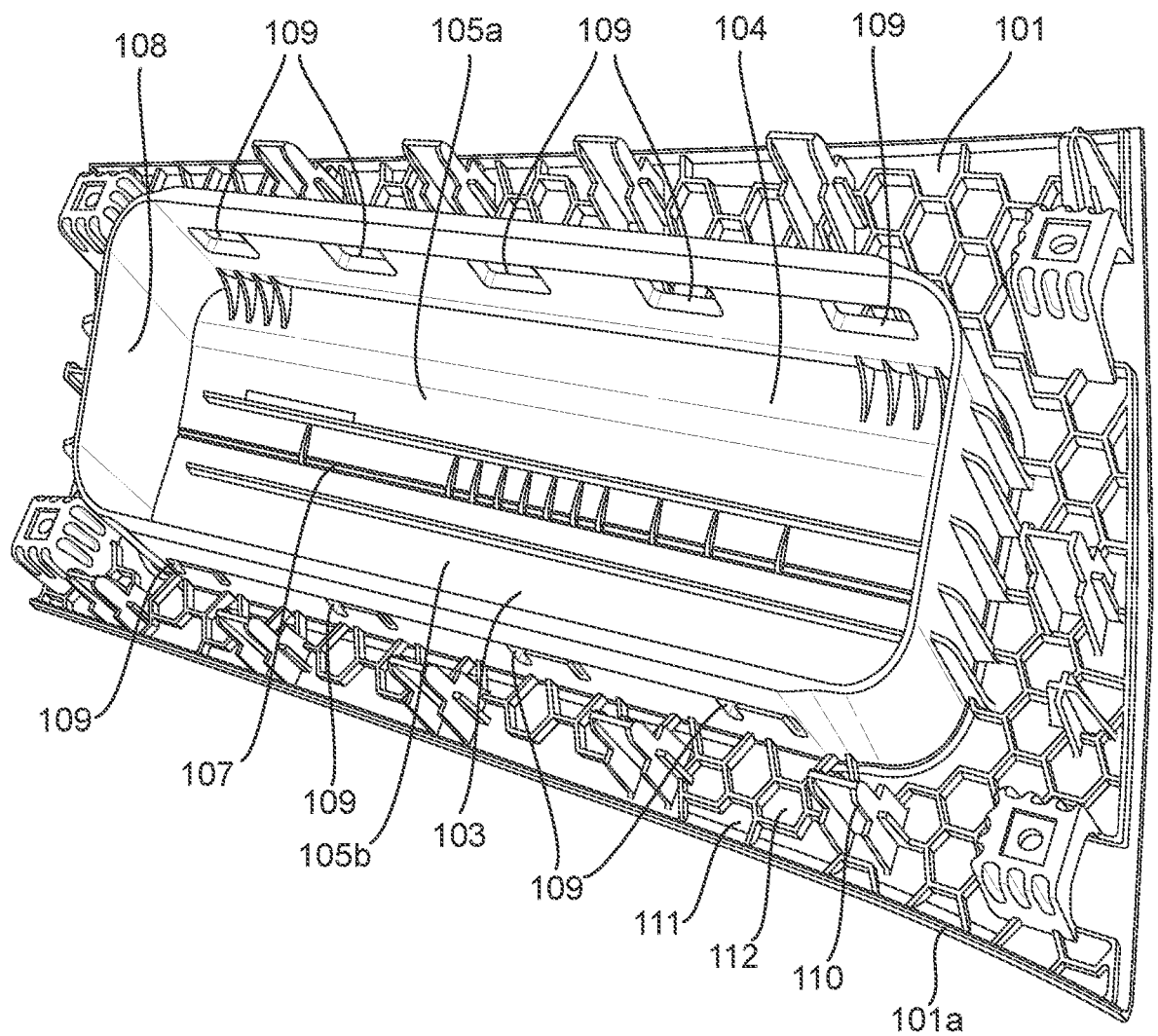
FIG. 2 is a rear perspective view of an interior trim panel of a vehicle.

FIG. 2 shows an inner surface 111 on an airbag-facing side of the panel 101. The panel 101 includes the region 103 having two door sections 105a, 105b that are joined towards the middle of the panel 101 by a tear seam 107. The region 103 may cover an opening 104 through which the airbag may deploy. The tear seam 107 may be spaced apart from edges of the region 103. In the arrangement shown in FIG. 2, each of the door sections 105a, 105b are approximately equal in size, such that each door section 105a, 105b covers approximately half of the region 103. However, in one or more other arrangements, the door sections 105a, 105b may be of any appropriate size and shape. Indeed, the panel 101 may include any appropriate number of door sections (e.g., one or more sections) that cooperate to cover the airbag when the panel 101 is installed to a vehicle.

In the arrangement shown in FIG. 2, the panel 101 is formed from a single piece of material. For example, the panel 101 may be formed from a single piece of polymeric material, e.g., by virtue of an injection moulding process. As such, when viewed from a passenger-facing side, the region 103 includes a single unbroken surface that extends across the door sections 105a, 105b and the tear seam 107. In this manner, a passenger of the vehicle may be unaware that the panel 101 is formed from one or more door sections 105a, 105b, and/or that the panel 101 includes a weakened region around the tear seam.

When viewed from the airbag-facing side, one of the door sections 105a extends from a top peripheral edge of the opening 104 towards the middle of opening, and the other of the door sections 105b extends from a bottom peripheral edge of the opening 104 towards the middle of the opening. The trim panel 101 and door sections 105a, 105b may be elongate. The tear seam 107 between the door sections 105a, 105b may extend in a substantially longitudinal direction of the panel 101. However, it is also envisaged that the door sections 105a, 105b and/or tear seam 107 may extend in any appropriate direction to cover the airbag.

The panel 101 further includes a perimeter wall 108 extending from the inner surface 111 of the vehicle trim panel and substantially surrounding the opening 104. The perimeter wall 108 may form a substantially tubular construction that is closed at one end by the door sections 105a, 105b prior to deployment of the airbag. The substantially tubular construction formed by the perimeter wall 108 may receive an airbag canister 130 (shown in FIG. 4) in which the airbag may be provided. The perimeter wall 108 may include a number of engaging portions, e.g., openings 109, for receiving cooperating parts of the canister to secure the airbag canister in place.

The perimeter wall 108 may be set back from edges 101a of the trim panel 101. Fixings 110 may be provided on the inner surface 111 of the trim panel to fasten the trim panel 101 to an underlying structure. Such fixings 110 may be provided on a rim 112 between the edges 101a of the trim panel 101 and the perimeter wall 108. Outer (cabin facing) surfaces of the door sections 105a, 105b may together be contiguous and continuous with an outer surface of the rim 112.

The tear seam 107 joins the two door sections 105a, 105b towards the middle of the panel 101. In the arrangement shown in FIG. 2, the tear seam 107 includes a channel that extends across the opening 104. The tear seam 107 is configured to reduce locally the thickness of the panel 101 to provide a line of weakness in the panel 101, such that the tear-open airbag deployment region 103 bursts open upon the activation of an airbag provided behind the panel 101. As mentioned above, where an airbag panel 101 has a tear seam 107 provided across the middle of the airbag deployment region 103, it is difficult to support the door sections 105a, 105b of the panel 101 to resist the application of force from the passenger-facing side of the panel 101. As such, an airbag panel having a plurality of sections, or doors, may be prone to inadvertent damage during everyday use of the vehicle to which the panel is installed.

Figure 3A:
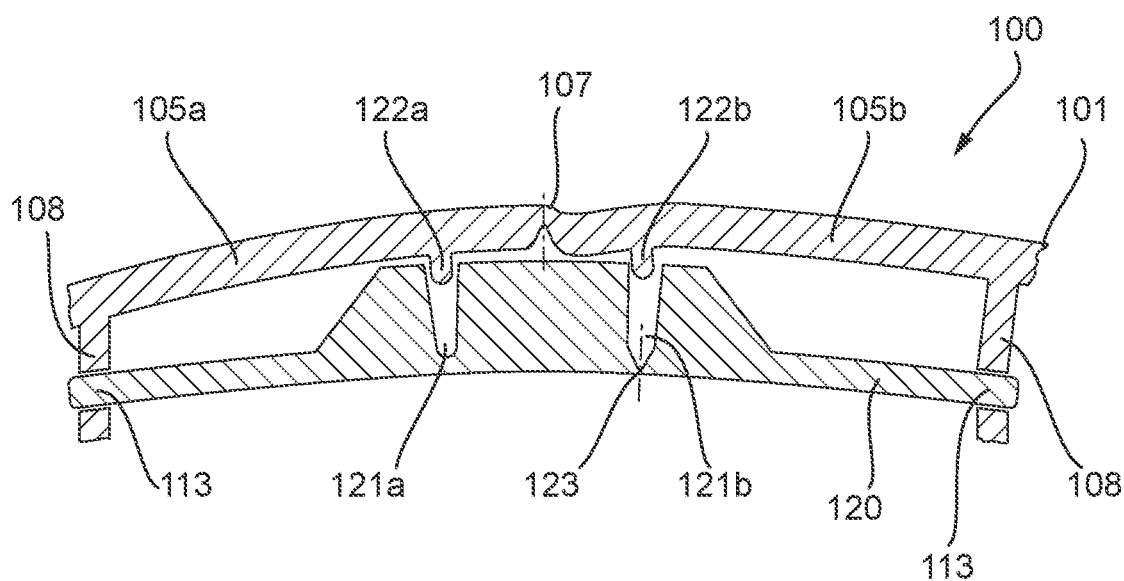
FIGS. 3a and 3b (collectively FIG. 3) are schematic sectional views of a vehicle airbag assembly including a bridging member according to a first example of the present disclosure, with FIGS. 3a and 3b showing the assembly prior to and during the application of an external force respectively.

With reference to FIG. 3, a vehicle airbag assembly 100 according to the present disclosure includes the trim panel 101 described above and a bridging member 120. The bridging member 120 is provided adjacent to an inner surface of the door sections 105a, 105b. In particular, the bridging member 120 is configured to contact and support the inner surface of the door sections 105a, 105b at a location away from the rim 112 and support the door sections 105*a*, 105*b* in the pre-deployed state.

In a first example of the bridging member 120 depicted in FIG. 3, the bridging member extends across the opening 104. In particular, the bridging member 120 may span the width of the opening 104, although it may instead span the length of the opening. The bridging member 120 may form a beam that extends from one side of the opening 104 to the other. The vehicle airbag assembly 100 may include one or more of the bridging members 120. In the case of there being more than one, the bridging members may be spaced apart in a lengthwise direction of the opening 104.

The perimeter wall 108 of the panel 101 may include slots 113 in opposing sides of the perimeter wall for receiving corresponding ends of the bridging member 120. In an alternative arrangement, the slots 113 may be provided in a side wall of the airbag canister. One or more of the slots 113 may be dimensioned to be greater than the corresponding size of the bridging member end to account for manufacturing tolerances.

Figure 3B:
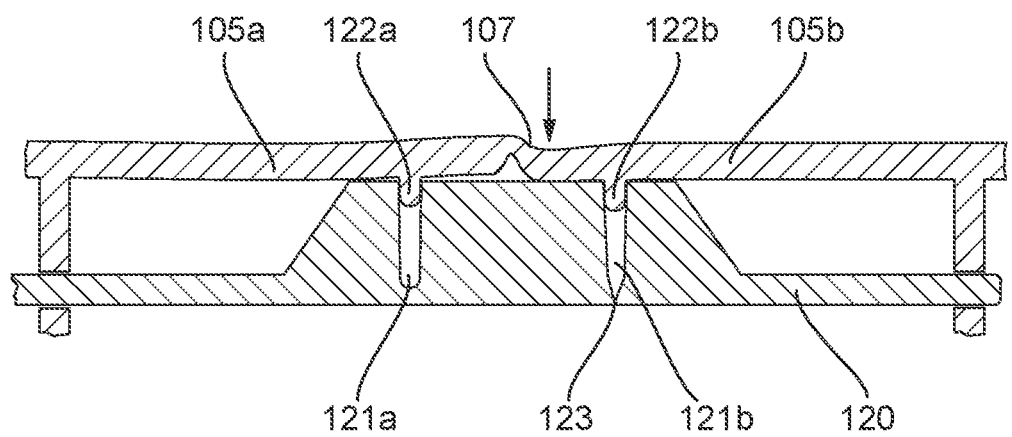

In a middle region, the bridging member 120 may include a pair of grooves 121*a*, 121*b* for receiving corresponding protrusions 122*a*, 122*b* on the inner surface of respective door sections 105*a*, 105*b*. The grooves 121*a*, 121*b* may be provided in a raised portion of the bridging member 120. As shown in FIG. 3*b*, the grooves 121*a*, 121*b* lock onto the protrusions 122*a*, 122*b* when a force is applied to an outer surface of the door sections 105*a*, 105*b*. The supporting action of the bridging member 120 and the additional locking action help to resist deformation of the door sections 105*a*, 105*b* upon application of an external force.

The bridging member 120 may include a frangible portion that may break upon deployment of the airbag. The bridging member 120 (or portions thereof) may move out of the way of a deploying airbag once the frangible portion has broken. In the first example of the bridging member 120, the frangible portion is in the form of a weakened section 123 at the bottom of one (or both) of the grooves 121*a*, 121*b*. Upon deployment of the airbag, the pressure of the deploying airbag breaks the weakened section 123 in the bridging member 120 and the bridging member divides into two parts permitting the passage of the airbag. If the bridging member 120 is provided at one or more discrete locations across the opening 104, the airbag may contact the inner surface of the door sections 105*a*, 105*b* between bridging members 120 and may thus break both the tear seam 107 and weakened section 123 at the same or a similar time.

Figure 4A:
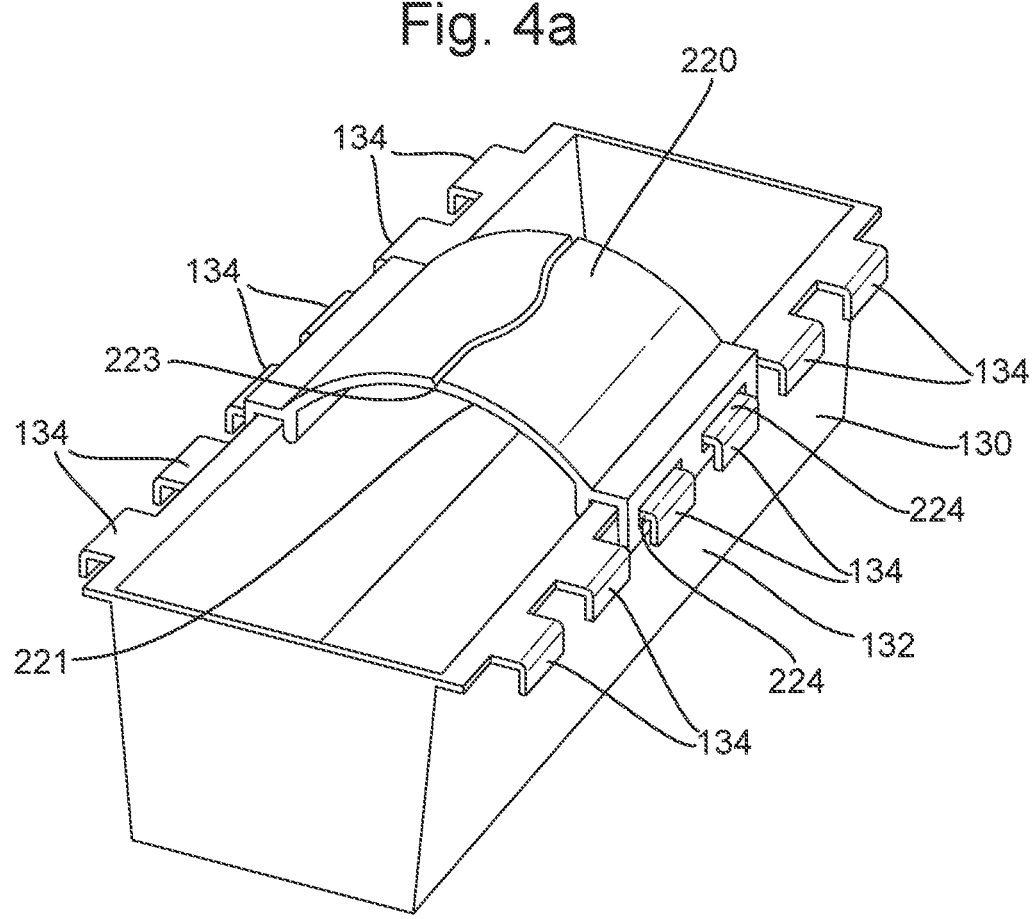
FIGS. 4a and 4b (collectively FIG. 4) are schematic perspective and sectional views respectively of a vehicle airbag assembly including a bridging member according to a second example of the present disclosure.
Figure 4B:
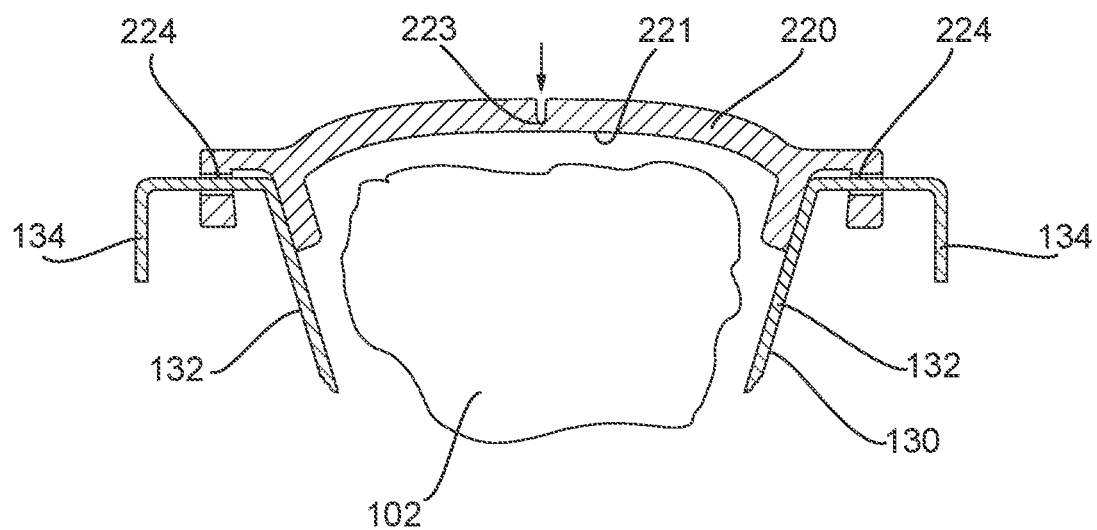

With reference to FIG. 4, a bridging member 220 according to a second example of the present disclosure will now be described and where compatible any of the features of the first example of the bridging member 120 may apply to the second example of the bridging member 220. As shown, the bridging member 220 may form an arch 221 (e.g., curved member) that spans across the trim panel opening 104 from one side to another (e.g., across the shorter span). A convex side of the arch 221 may face the inner surface of the door sections 105*a*, 105*b*, whereas a concave side of the arch 221 may face the airbag 102. Accordingly, the arch 221 may rise from ends of the arch towards a point of contact with the inner surface of the door sections 105*a*, 105*b*. The arch 221 may provide rigidity in compression, e.g., when a force is applied on the trim panel outer surface. By contrast, the arch 221 may readily collapse when a force is applied by a deploying airbag 102 on the concave side.

In the particular example shown, the bridging member 220 couples to the airbag canister 130, such as to a housing wall 132 of the airbag canister 130. (It is also envisaged that the bridging member 220 may couple to the trim panel perimeter wall 108, e.g., in a manner similar to that described above for the first example of the bridging member.) More specifically, the airbag canister 130 may include one or more tabs 134 and the bridging member 220 may connect to the tabs 134. The tabs 134 may extend from the housing wall 132 and may be received in the openings 109 of the trim panel perimeter wall 108. Ends of the bridging member 220 may have openings 224, which receive the tabs 134. The bridging member 220 may connect to one or more of the tabs 134 at each end of the bridging member.

The bridging member 220 may include a frangible portion that may break upon deployment of the airbag. The bridging member 220 (or portions thereof) may move out of the way of a deploying airbag once the frangible portion has broken. In the second example of the bridging member 220, the frangible portion is in the form a weakened section 223 on an outer facing surface of the bridging member 220. Upon deployment of the airbag, the pressure of the deploying airbag breaks the weakened section 223 in the bridging member 220 and the bridging member divides into two parts permitting the passage of the airbag 102.

With reference to FIG. 5, a bridging member 320 according to a third example of the present disclosure will now be described and where compatible any of the features of the previous examples of the bridging member 120, 220 may apply to the third example of the bridging member 320. As shown, the bridging member 320 may be formed by first and second struts 322*a*, 322*b*. The first and second struts 322*a*, 322*b* may extend from opposing sides of the trim panel perimeter wall 108 (or airbag canister housing wall 132) from a point spaced apart from the door sections 105*a*, 105*b*. The first and second struts 322*a*, 322*b* may extend towards one another and they may meet at the door sections 105*a*, 105*b* so as to support said door sections. The first and second struts 322*a*, 322*b* may thus resemble a form of arch.

The first and second struts 322*a*, 322*b* may be unitary and they may be moulded as a single piece. The first and second struts 322*a*, 322*b* may form a weakened section 323 where they meet. The weakened section 323 may be in the form of a notch, which may be disposed substantially in line with the tear seam 107.

Ends of the first and second struts 322*a*, 322*b* may each include at least one rib 325. The trim panel perimeter wall 108 (or airbag canister housing wall 132) may include at least one corresponding rib 114. The ribs 114, 325 may extend in a direction approximately parallel to the door sections 105*a*, 105*b*. The ribs 114, 325 may cooperate so as to resist movement of the first and second struts 322*a*, 322*b* ends relative to the trim panel perimeter wall 108 (or airbag canister housing wall 132). In particular, the ribs 114, 325 may also provide a snap fit for the bridging member 320 when it is installed against the door sections 105*a*, 105*b*.

Figure 5A:
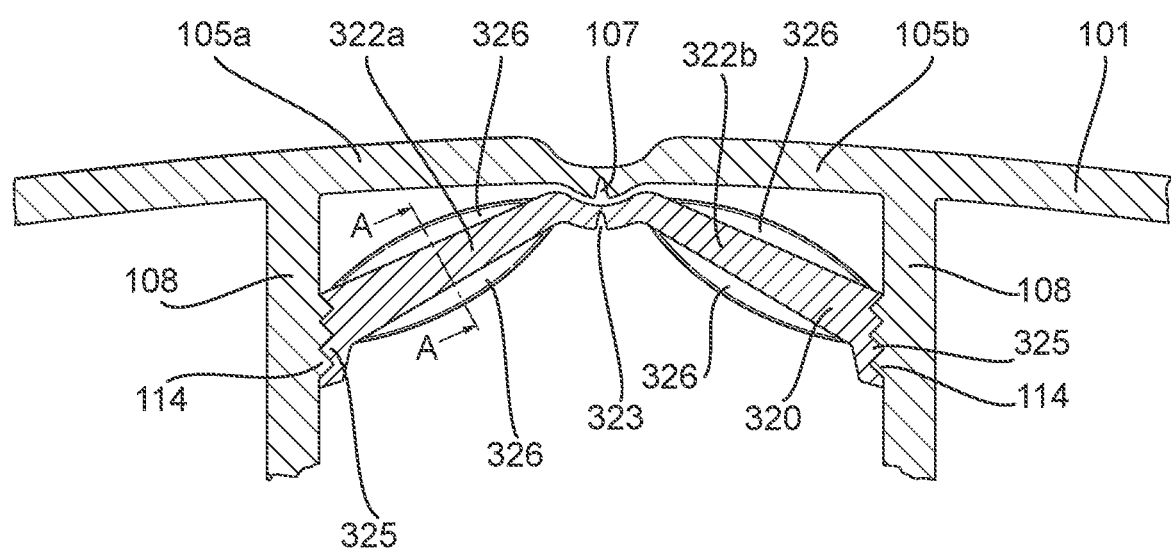
FIGS. 5a, 5b and 5c (collectively FIG. 5) are schematic views of a vehicle airbag assembly including a bridging member according to a third example of the present disclosure, with FIG. 5b showing section A-A depicted in FIG. 5a and FIG. 5c showing a perspective view of the coupling between the bridging member and the side wall.
Figure 5B:
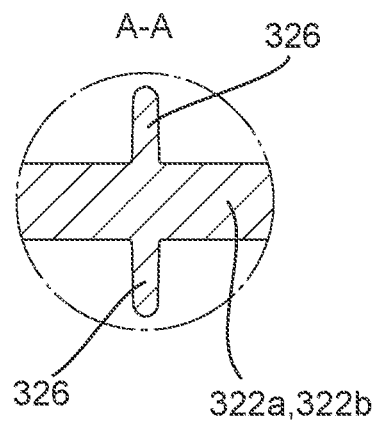

As depicted in FIGS. 5*a* and 5*b*, each of the first and second struts 322*a*, 322*b* may include at least one strengthening rib 326, which may provide additional rigidity to the first and second struts 322*a*, 322*b*. The strengthening ribs 326 may extend along the length of the first and second struts 322*a*, 322*b*. The strengthening ribs 326 may otherwise extend away from a longitudinal axis of the first and second struts 322*a*, 322*b* so as to increase their rigidity in a direction perpendicular to the door sections 105*a*, 105*b*. The strengthening ribs 326 may be rounded at their ends.

Figure 5C:
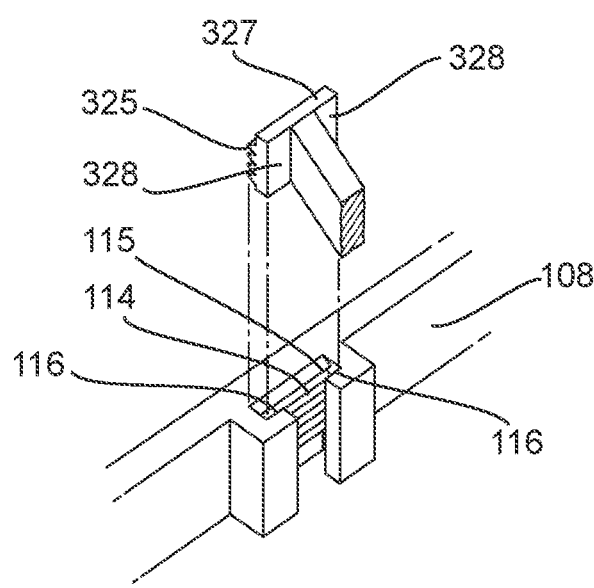

As shown in FIG. 5*c*, the trim panel perimeter wall 108 (or airbag canister housing wall 132) may include a channel or groove 115 configured to receive a cooperating part 327 on ends of the first and second struts 322*a*, 322*b*. The groove 115 and cooperating part 327 may cooperate to couple the bridging member 320 to the perimeter wall 108. In particular, the groove 115 and cooperating part 327 may be substantially T-shaped in profile, e.g., such that an abutment surface 328 on the cooperating part may abut a shoulder 116 of the groove 115. This arrangement may help hold the bridging member 320 in place. Furthermore, the groove 115 and cooperating part 115, 327 may have formed thereon the respective ribs 114, 325 mentioned above, such that the ribs slide over one another when the cooperating part 327 is forced into the groove 115, but the ribs otherwise resist movement of the strut ends relative to the perimeter wall 108.

Figure 6A:
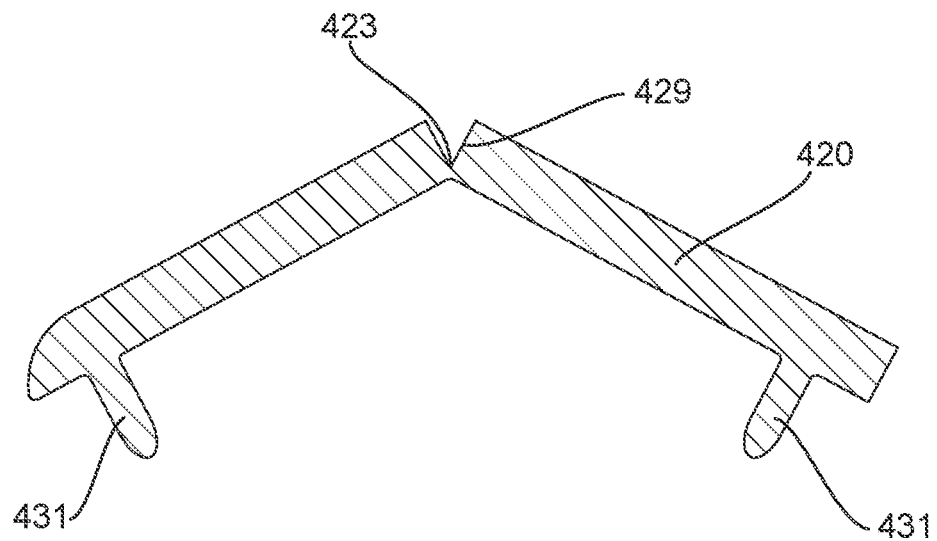
FIGS. 6a and 6b (collectively FIG. 6) are schematic sectional views of a bridging member according to a fourth example of the present disclosure, with FIGS. 6a and 6b respectively showing the bridging member prior to and after placement in a vehicle airbag assembly.
Figure 6B:
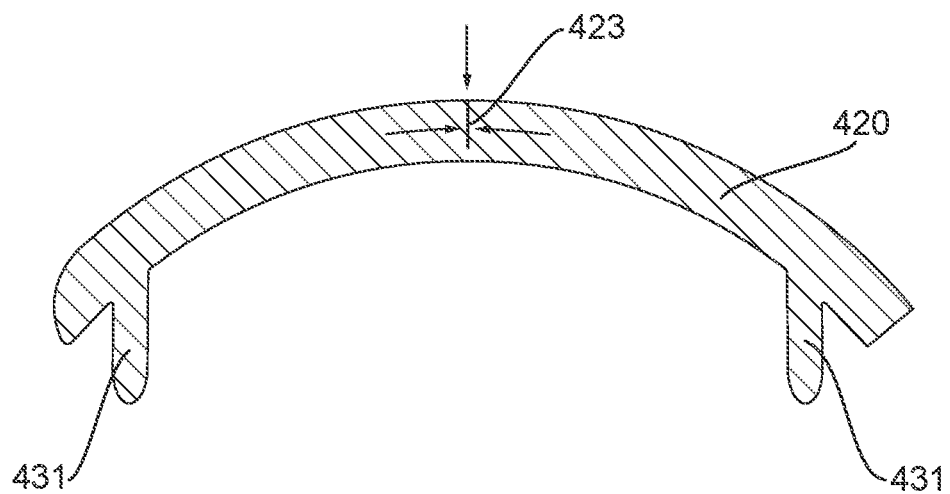

With reference to FIG. 6, a bridging member 420 according to a fourth example of the present disclosure will now be described and where compatible any of the features of the previous examples of the bridging member 120, 220, 320 may apply to the fourth example of the bridging member 420. As shown in FIG. 6b, the bridging member 420 may be substantially similar to the second example of the bridging member 220 and as such may form an arch between sides of the trim panel perimeter wall 108 or airbag canister housing wall 132. However, it is also envisaged that the bridging member 420 may be similar to any of the other bridging members described herein.

During installation the bridging member 420 may be deformed from a neutral state (as shown in FIG. 6a) to an installed state (as shown in FIG. 6b). The bridging member 420 may be manufactured (e.g., moulded) in the neutral state and may subsequently be deformed (e.g., bent) into the installed state. The bridging member 420 may be resilient such that it tends to return to its neutral state. Accordingly, once installed the bridging member 420 may be stressed such that the bridging member may be biased towards the inner surface of the door sections 105a, 105b. This pre-stress may provide additional support to the door sections 105a, 105b and may also assist the airbag in breaking through the bridging member 420.

Between the initial and installed states the bridging member 420 may bend about a weakened section 423 that provides a frangible portion of the bridging member 420. In particular, the weakened section 423 may be formed by a notch 429 in a surface of the bridging member 420 and the bridging member may tend to bend at the notch. The notch 429 may be substantially closed in the installed state.

Figure 7:
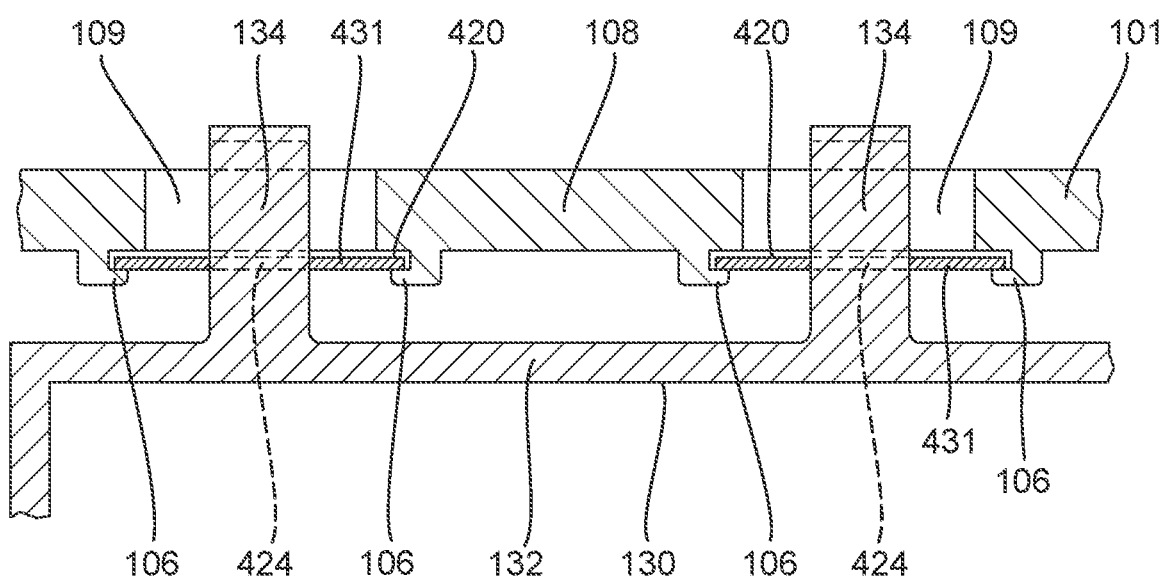
FIG. 7 is a sectional view of a vehicle airbag assembly showing a connection between the trim panel and a bridging member according to one or more examples of the present disclosure.

FIG. 7 shows how the bridging member 420 may connect to the trim panel 101. In particular, the bridging member 420 may include arms 431 at ends of the bridging member and the arms 431 may project between the airbag canister housing wall 132 and the trim panel perimeter wall 108. The arms 431 may have openings 424 through which the tabs 134 of the airbag canister 130 may extend. The tabs 134 may also extend through the corresponding openings 109 in the trim panel perimeter wall 108. The bridging member 420 may thus make use of the fastening between the airbag canister 130 and trim panel perimeter wall 108.

The trim panel perimeter wall 108 may include guide projections 106 either side of the openings 109. The guide projections 106 either side of a particular opening 109 may form a channel that receives a corresponding bridging member arm 431. The guide projections 106 may help secure the bridging member 420 in place.

This connection arrangement shown in FIG. 7 may also apply to one or more other examples of the bridging member disclosed herein.

Figure 8:
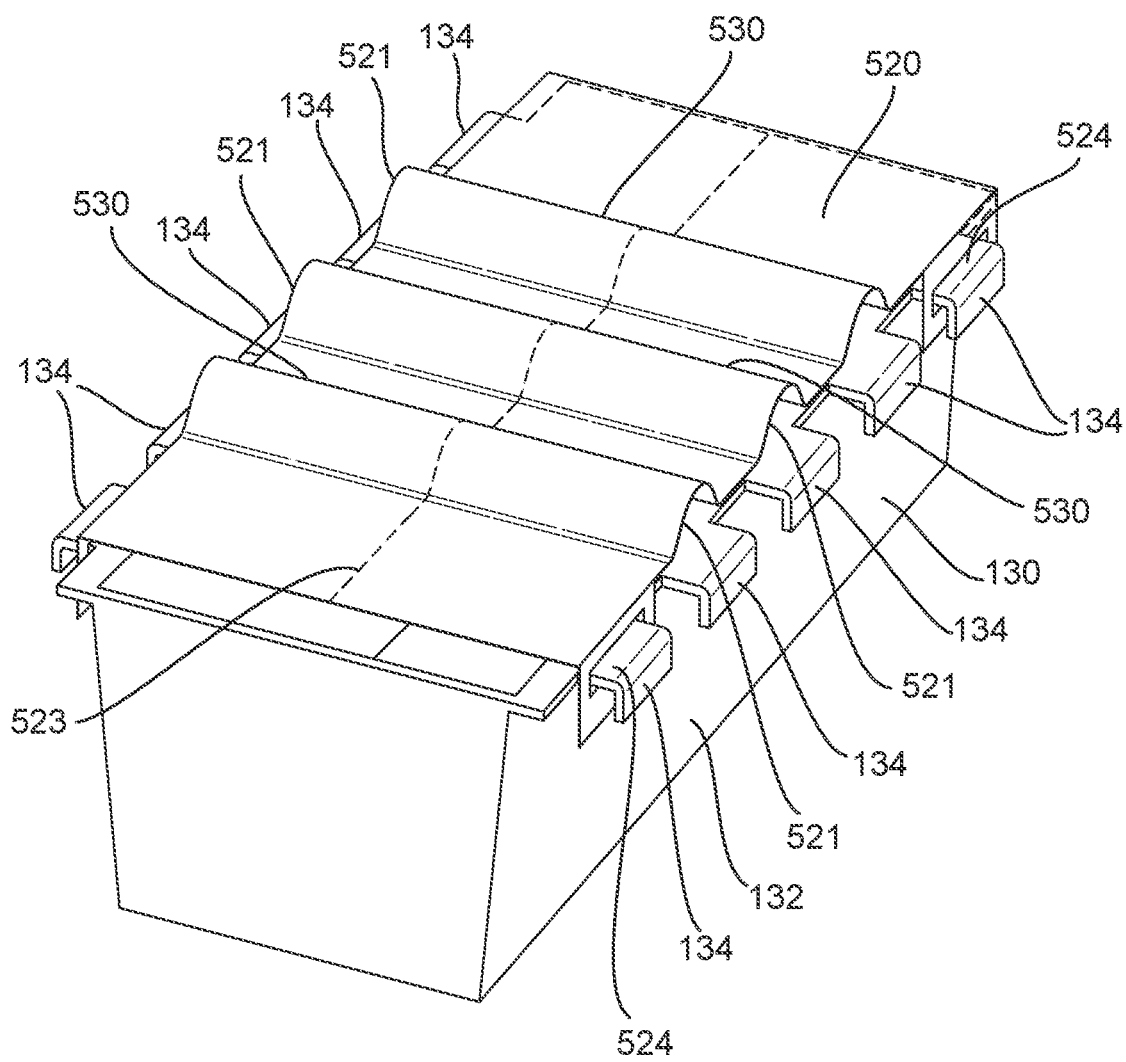
FIG. 8 is a schematic perspective view of a vehicle airbag assembly including a bridging member according to a fifth example of the present disclosure.

With reference to FIG. 8, a bridging member 520 according to a fifth example of the present disclosure will now be described and where compatible any of the features of the previous examples of the bridging member 120, 220, 320, 420 may apply to the fifth example of the bridging member 520. The bridging member 520 may be formed by at least one arch 521 with an apex 530 that extends across the width of the trim panel opening 104. The apexes 530 may support the underside of the door sections 105a, 105b.

As depicted, a plurality of such arches 521 may be provided alongside one another and neighbouring arches 521 may be joined to one another. By way of example, the arches 521 may be formed from a sheet of material and may thus resemble a corrugated sheet. In particular, the bridging member 520 may be formed from a fabric material, such as a laminated fabric.

In a manner similar to that for the second example of the bridging member 220, the bridging member 520 may connect to the tabs 134 of the airbag canister 130. Corners of the bridging member 520 may have openings 524, which receive the tabs 134. When stretched out, the bridging member 520 may be longer than the distance between tabs 134 at the opposing ends of the canister 130. Accordingly, the bridging member 520 may form a crumpled or corrugated shape when the bridging member openings 524 engage the tabs 134.

The bridging member 520 may also include a weakened section 523, for example in the form of a tear seam. The weakened section 523 may extend along a length of the bridging member 520, in particular across each of the arches 521. The weakened section 523 may be provided in approximately the middle of the bridging member 520. The weakened section 523 may break when the airbag is deployed such that the bridging member 520 does not impede progress of the airbag.

Figure 9:
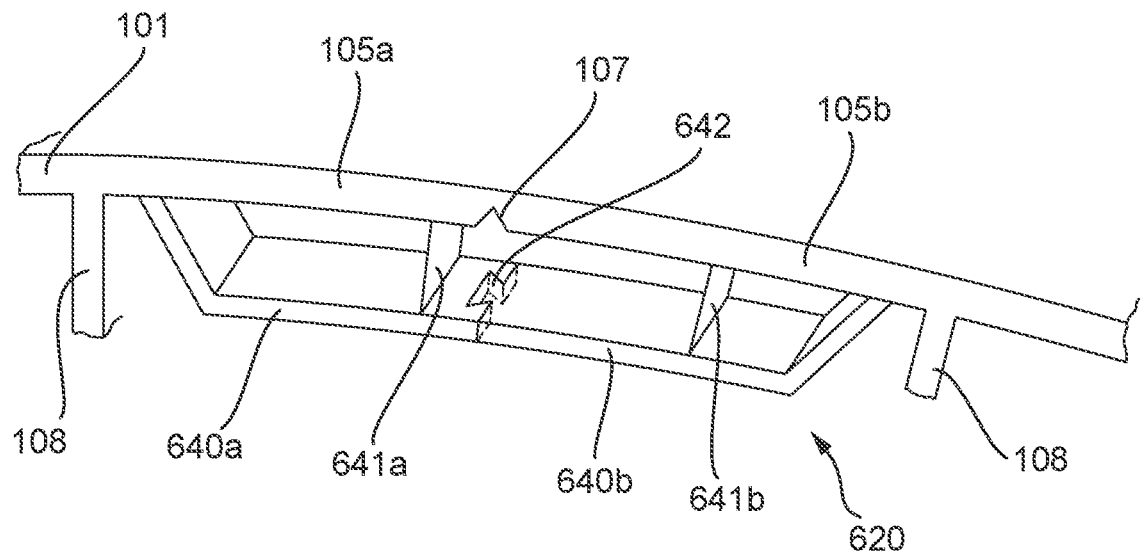
FIG. 9 is a schematic perspective view of a vehicle airbag assembly including a bridging member according to a sixth example of the present disclosure.

With reference to FIG. 9, a bridging member 620 according to a sixth example of the present disclosure will now be described and where compatible any of the features of the previous examples of the bridging member 120, 220, 320, 420, 520 may apply to the sixth example of the bridging member 620. The bridging member 620 may include first and second bridging portions 640a, 640b. The first and second bridging portions 640a, 640b may be provided on respective inner facing surfaces of the door sections 105a, 105b and the first and second bridging portions may connect to each other to support the door sections. The first and second bridging portions 640a, 640b may connect approximately in line with where the door sections 105a, 105b meet.

The first and second bridging portions 640a, 640b may be spaced apart from the inner surfaces of the door sections 105a, 105b, at least where the door sections meet. Respective supports 641a, 641b may extend between the first and second bridging portions 640a, 640b and the inner surfaces of the door sections 105a, 105b. The supports 641a, 641b may provide additional rigidity and help ensure that the first and second bridging portions 640a, 640b are spaced apart from the inner surfaces of the door sections. The bridging portions 640a, 640b (and supports) may be integral with the door sections 105a, 105b, for example they may be moulded together.

The first and second bridging portions 640a, 640b may be in tension when the door sections 105a, 105b are depressed. To resist this tension, the first and second bridging portions 640a, 640b may interlock together, e.g., by virtue of overlapping portions. As depicted in FIG. 9, the overlapping portions may be provided by a dovetail connection 642 with a dovetail part on one of the first and second bridging portions 640a, 640b being received in a corresponding recess on the other of the first and second bridging portions.

Figure 10:
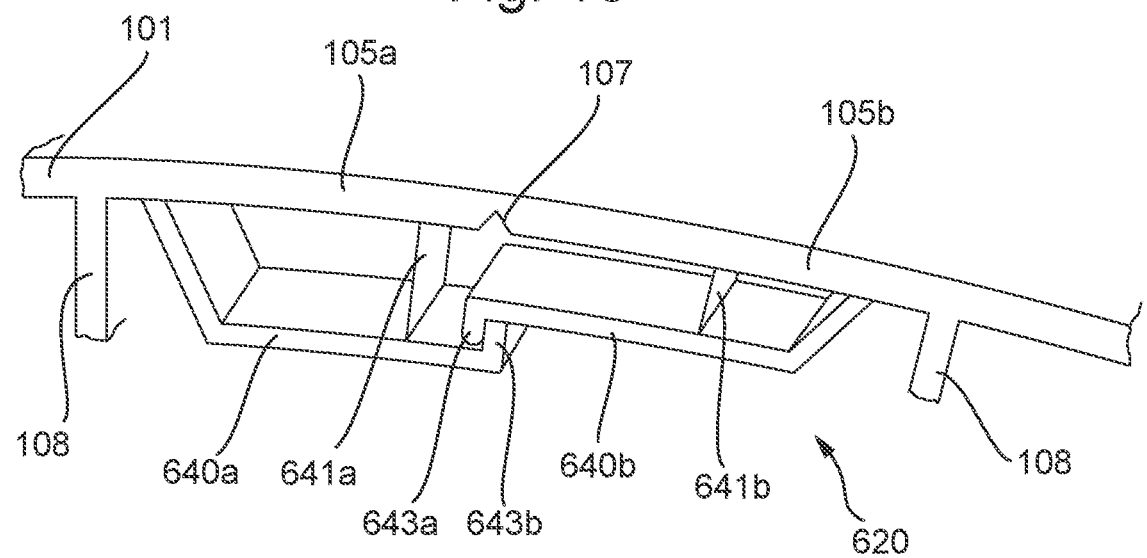
FIG. 10 is a partial sectional view depicting a variant of the bridging member according to the sixth example of the present disclosure.

FIG. 10 depicts a variant of the bridging member 620 in which the overlapping portions are provided by first and second projections 643a, 643b, which extend from respective first and second bridging portions 640a, 640b, and which engage each other to resist the tensile force.

In either of the variants shown in FIGS. 9 and 10, the overlapping portions may transmit a tensile force between the first and second bridging portions 640a, 640b. However, in the event of the airbag being deployed, the overlapping portions may readily rotate relative to each other, thereby permitting the first and second bridging portions 640a, 640b to move apart.

With reference to FIG. 11, a bridging member 720 according to a seventh example of the present disclosure will now be described and where compatible any of the features of the previous examples of the bridging member 120, 220, 320, 420, 520, 620 may apply to the seventh example of the bridging member 720. The bridging member 720 includes first and second bridging portions 750a, 750b, e.g., in the form of supporting struts. The first and second bridging portions 750a, 750b may be separate from one another. The first and second bridging portions 750a, 750b may extend from opposite sides of the trim panel opening 104 and together may extend across at least a portion of the width of the opening 104.

At one end, each of the first and second bridging portions 750a, 750b are coupled to opposite sides of the trim panel perimeter wall 108 at points spaced apart from the door sections 105a, 105b. The other end of each of the first and second bridging portions 750a, 750b supports the inner surface of a respective door section 105a, 105b away from the perimeter wall 108. In particular, the other end of the first and second bridging portions 750a, 750b may engage the respective door section 105a, 105b at a point close to the tear seam 107. The first and second bridging portions 750a, 750b may thus provide triangulation to support the door sections 105a, 105b.

Although a pair of bridging portions 750a, 750b are shown, it is also envisaged that only one bridging portion may be provided, e.g., on one side of the opening 104 and supporting a central region of the door sections 105a, 105b. The first and second bridging portions 750a, 750b may otherwise be provided at the same lengthwise location of the trim panel opening 104 or they may be provided at different lengthwise locations, e.g., in a staggered arrangement.

Furthermore, the bridging portions 750a, 750b may be provided at a single longitudinal location along the length of the trim panel opening 104 or further pairs of bridging portions 750a, 750b may be provided at other longitudinal locations across the opening 104. The bridging portions 750a, 750b may also span a lengthwise portion along the opening 104.

Figure 11A:
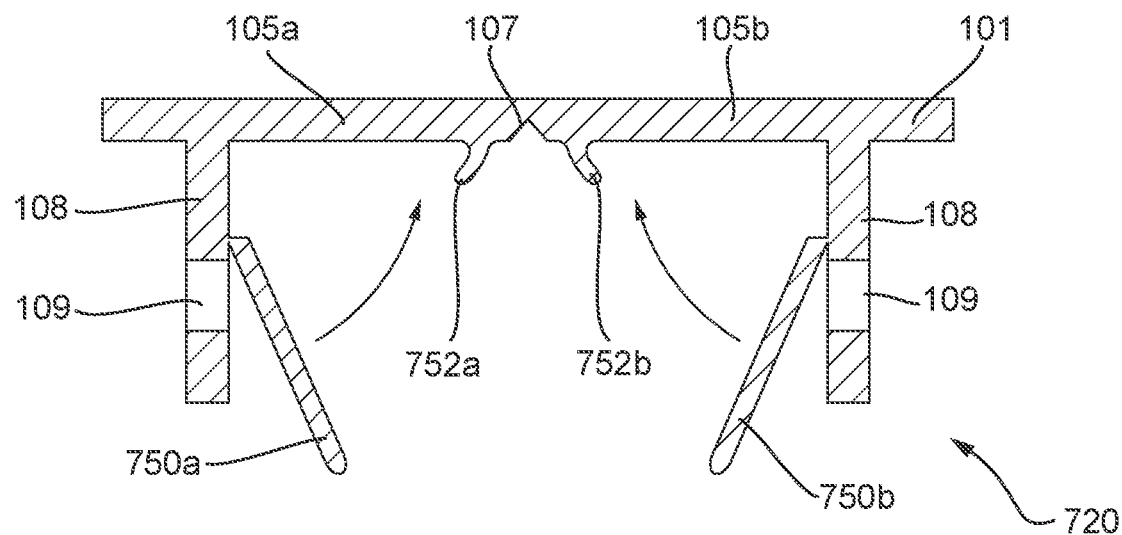
FIGS. 11a and 11b (collectively FIG. 11) are schematic sectional views of a bridging member according to a seventh example of the present disclosure, with FIGS. 11a and 11b respectively showing the bridging member prior to and after assembly.
Figure 11B:
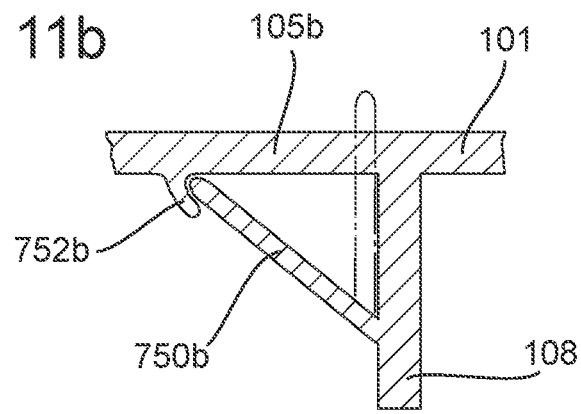

As depicted in FIG. 11a, the first and second bridging portions 750a, 750b are rotatably coupled to opposite sides of the trim panel perimeter wall 108. The first and second bridging portions 750a, 750b may be rotated into a supporting position shown in FIG. 11b, in which the first and second bridging portions 750a, 750b engage the door sections 105a, 105b. Respective projections 752a, 752b may project from the inner surface of the door sections 105a, 105b to cooperate with ends of the first and second bridging portions 750a, 750b. The projections 752a, 752b may thus help keep the first and second bridging portions 750a, 750b in the supporting position. During assembly, the first and second bridging portions 750a, 750b may resiliently snap into place with respect to the projections 752a, 752b when the first and second bridging portions 750a, 750b are rotated into engagement with the first and second bridging portions 750a, 750b.

Figure 12:
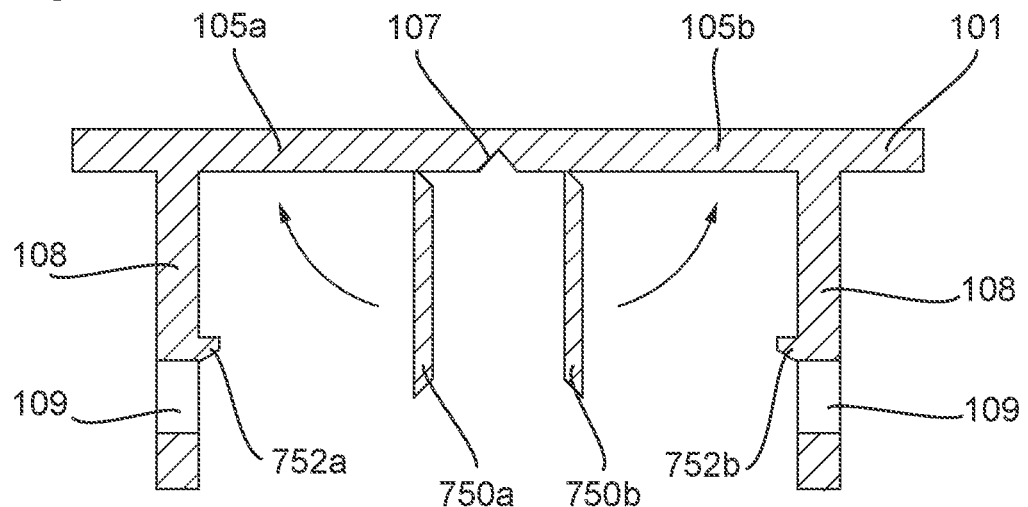
FIG. 12 is a schematic sectional view depicting a variant of the bridging member according to the seventh example of the present disclosure.

FIG. 12 depicts a variant of the bridging member 720 in which the first and second bridging portions 750a, 750b are instead rotatably coupled to respective door sections 105a, 105b. The projections 752a, 752b are provided on the perimeter wall 108. The first and second bridging portions 750a, 750b may rotate into engagement with the perimeter wall and may be secured by the projections 752a, 752b. The variant depicted in FIG. 12 thus functions in a similar manner to that depicted in FIG. 11.

In either of the variants, the bridging member 720 (e.g., bridging portions 750a, 750b) may be formed integral to the trim panel 101, e.g., in a moulding process. The bridging portions 750a, 750b may be joined to the perimeter wall 108 (or door sections 105a, 105b) by virtue of a living hinge. Such a living hinge may be formed in a moulding process.

Also, in either of the variants, the first and second bridging portions 750a, 750b may help guide or channel the airbag towards the tear seam 107. The tear seam 107 may thus break quickly and when the door sections 105a, 105b open, the first and second bridging portions 750a, 750b may readily move out of the way.

Figure 13:
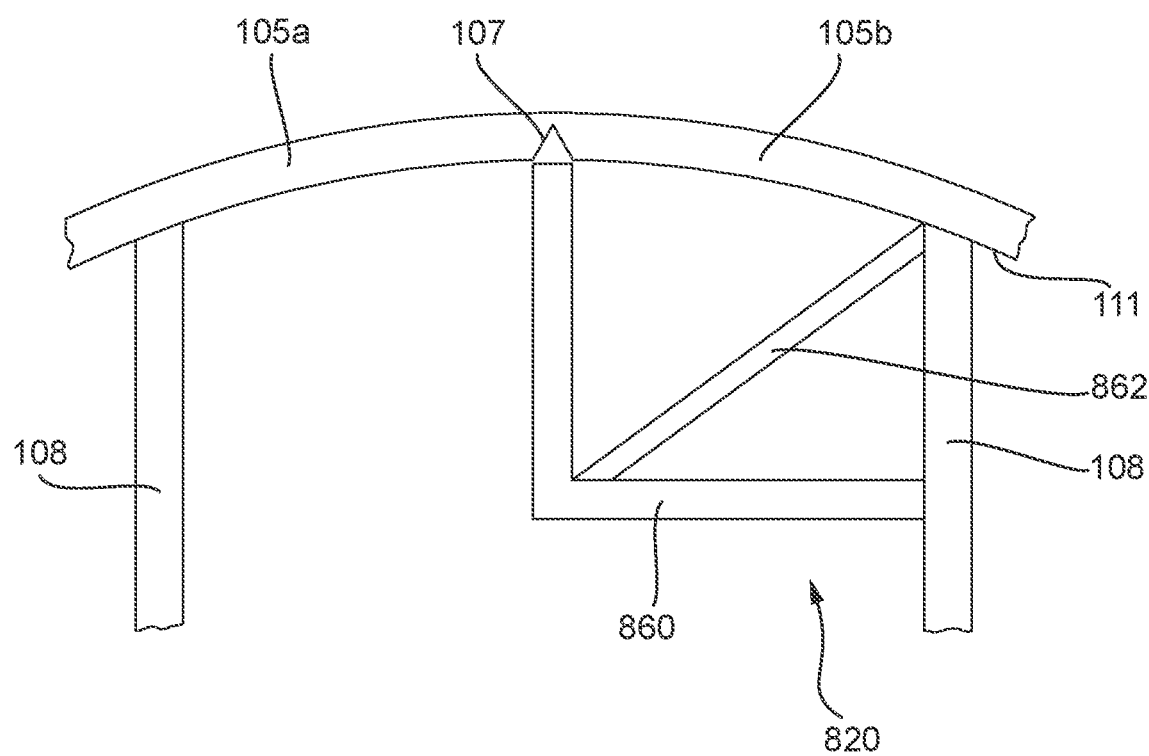
FIG. 13 is a schematic sectional view of a vehicle airbag assembly including a bridging member according to an eighth example of the present disclosure.

With reference to FIG. 13, a bridging member 820 according to an eighth example of the present disclosure will now be described and where compatible any of the features of the previous examples of the bridging member 120, 220, 320, 420, 520, 620, 720 may apply to the eighth example of the bridging member 820. The bridging member 820 may include a rigid portion 860 and a slender or flexible portion 862. The rigid portion 860 may contact the inner surface of the door sections 105a, 105b, e.g., at or near the tear seam 107, to support the door sections 105a, 105b. The rigid portion 860 may otherwise be coupled (e.g., rotatably via a pivot point or a flexible coupling, such as a living hinge) to the trim panel 101, for example at the perimeter wall 108. In the example depicted, the rigid portion 860 is a substantially right-angled member, which extends from the perimeter wall 108 and then towards the door sections 105a, 105b, but other shapes are also contemplated.

The flexible portion 862 may transmit a tensile force, but may not transmit or may readily buckle under a compressive force. For example, the flexible portion 862 may include a string or other such slender flexible member. A first end of the flexible portion 862 connects to the trim panel 101 at a point spaced apart from where the rigid portion 860 couples to the trim panel. For example, the first end of the flexible portion 862 may connect to the trim panel where the perimeter wall 108 meets the inner surface 111 of the trim panel. A second end of the flexible portion 862 may connect to the rigid portion 860 also at a point spaced apart from where the rigid portion 860 couples to the trim panel.

The flexible portion 862 may be taut when the rigid portion 860 is engaged with the door sections 105a, 105b. The rigid portion 860 may thus be suspended from the flexible portion 862 so as to restrict movement of the rigid portion away from the inner surface of the door sections 105a, 105b. The flexible portion 862 may thus support the rigid portion 860 when the trim panel 101 is depressed. By contrast, the flexible portion 862 may flex and the rigid portion 860 may be free to move out of the way when the airbag is deployed.

Although one bridging member 820 is depicted in FIG. 13, it will be appreciated that other bridging members may be provided, e.g., extending from the opposite side of the perimeter wall 108 and/or at other longitudinal positions along the length of trim panel opening 104. Also, the bridging member 820 may extend over a longitudinal portion of the opening 104.

With reference to FIG. 14, the present disclosure may also relate to a method 900 of forming the vehicle airbag assembly 100. The method includes a first step 910 in which the trim panel 101 is provided. In a second step 920, any of the above-described bridging members 120, 220, 320, 420, 520, 620, 720, 820 may be deployed or installed onto the trim panel 101. By way of example, the bridging member 120, 220, 320, 420, 520, 620, 720, 820 may be retro-fitted to an existing vehicle trim panel.

The bridging member may be installed so that it is adjacent to the inner surface of the door sections 105a, 105b. In particular, the bridging member may contact the inner surface of the door sections 105a, 105b at a location away from the trim panel rim 112 and support the door sections 105a, 105b in the pre-deployed state. The bridging member is subsequently movable upon deployment of the airbag such that the airbag is permitted to pass through the opening.

Any of the above-described bridging members may be formed from a polymer (e.g., plastics) material. The bridging member may be moulded. The bridging member may be moulded separately from the trim panel or the bridging member may be moulded together with the trim panel such that the trim panel and bridging member are integral.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

The invention claimed is:

1. A vehicle airbag assembly comprising:
a vehicle trim panel including at least one door having an outer surface configured to face a vehicle cabin and an inner surface configured to face an airbag prior to deployment, wherein in a pre-deployed state the door extends across an opening, and wherein the door is movably coupled to a rim of the vehicle trim panel such that the door is configured to open upon deployment of the airbag to permit passage of the airbag through the opening, at least one edge of the door having a tear seam that couples the door to a corresponding edge of the vehicle trim panel and breaks upon deployment of the airbag;
a bridging member provided adjacent to the inner surface of the door, the bridging member configured to contact the inner surface at a location away from the rim and support the door in the pre-deployed state, wherein the bridging member extends at least partially across the opening and is movable upon deployment of the airbag such that the airbag is permitted to pass through the opening,
a side wall, wherein the bridging member is rotatably coupled to one of the side wall and the door; and
a projection projecting from the other of the side wall and door, such that during assembly the bridging member resiliently snaps into place with respect to the projection when the bridging member is rotated into engagement with the other of the side wall and door.

2. The vehicle airbag assembly of claim 1, wherein the vehicle trim panel includes a perimeter wall extending from an inner surface of the vehicle trim panel and substantially surrounding the opening, and wherein the perimeter wall is configured to receive an airbag canister in which the airbag is provided.

3. The vehicle airbag assembly of claim 1, wherein the perimeter wall forms the side wall to which the bridging member is coupled.

4. The vehicle airbag assembly of claim 1, further comprising an airbag canister in which the airbag is provided.

5. The vehicle airbag assembly of claim 4, wherein the airbag canister includes a housing wall and the housing wall forms the side wall to which the bridging member is coupled.

6. The vehicle airbag assembly of claim 1, wherein the bridging member extends across a width of the opening.

7. The vehicle airbag assembly of claim 6, wherein the bridging member spans the width of the opening.

8. The vehicle airbag assembly of claim 6, wherein the bridging member extends across a portion of the width of the opening.

9. The vehicle airbag assembly of claim 6, further comprising a pair of bridging members extending from opposite sides of the opening and that together extend across at least a portion of the width of the opening.

10. The vehicle airbag assembly of claim 6, further comprising a plurality of bridging members spaced apart in a lengthwise direction of the opening.

11. The vehicle airbag assembly of claim 6, wherein the bridging member includes a frangible portion that is configured to break upon deployment of the airbag.

12. The vehicle airbag assembly of claim 1, wherein the bridging member includes at least one strut that supports the inner surface of the door.

13. The vehicle airbag assembly of claim 1, wherein the bridging member is formed integral to the vehicle trim panel.

14. The vehicle airbag assembly of claim 1, wherein the bridging member is pre-stressed such that the bridging member is biased towards the inner surface of the door.

15. A vehicle comprising the vehicle airbag assembly of claim 1.

16. A method of forming a vehicle airbag assembly, the method comprising:
providing a vehicle trim panel including at least one door having an outer surface configured to face a vehicle cabin and an inner surface configured to face an airbag prior to deployment, wherein in a pre-deployed state the door extends across an opening, and wherein the door is movably coupled to a rim of the vehicle trim panel such that the door is configured to open upon deployment of the airbag to permit passage of the airbag through the opening, at least one edge of the door having a tear seam that couples the door to a corresponding edge of the vehicle trim panel and breaks upon deployment of the airbag;
deploying a bridging member so as to be adjacent to the inner surface of the door, the bridging member configured to contact the inner surface at a location away from the rim and support the door in its pre-deployed state, wherein the bridging member extends at least partially across the opening and is movable upon deployment of the airbag such that the airbag is permitted to pass through the opening, wherein the bridging member is rotatably coupled to one of a side wall of the vehicle airbag assembly and the door; and
during assembly resiliently snapping the bridging member into place with respect to a projection projecting from the other of the side wall and door when the bridging member is rotated into engagement with the other of the side wall and door.

\* \* \* \* \*